(12) United States Patent
Xing

(10) Patent No.: US 9,053,042 B2
(45) Date of Patent: Jun. 9, 2015

(54) METHOD, SYSTEM, AND DEVICE FOR MODIFYING A SECURE ENCLAVE CONFIGURATION WITHOUT CHANGING THE ENCLAVE MEASUREMENT

(75) Inventor: Bin Xing, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 331 days.

(21) Appl. No.: 13/534,327

(22) Filed: Jun. 27, 2012

(65) Prior Publication Data

US 2014/0006711 A1   Jan. 2, 2014

(51) Int. Cl.
| | |
|---|---|
| *G06F 12/00* | (2006.01) |
| *G06F 12/10* | (2006.01) |
| *G06F 12/02* | (2006.01) |
| *G06F 21/74* | (2013.01) |
| *G06F 12/08* | (2006.01) |

(52) U.S. Cl.
CPC ............ *G06F 12/10* (2013.01); *G06F 12/0866* (2013.01); *G06F 12/0802* (2013.01); *G06F 2212/1041* (2013.01); *G06F 2212/1056* (2013.01); *G06F 12/0223* (2013.01); *G06F 12/08* (2013.01); *G06F 21/74* (2013.01)

(58) Field of Classification Search
CPC .......................... G06F 12/0802; G06F 12/0866
USPC .......................................................... 711/118
See application file for complete search history.

(56) References Cited

U.S. PATENT DOCUMENTS

| | | | |
|---|---|---|---|
| 2006/0075312 A1* | 4/2006 | Fischer et al. | ................... 714/48 |
| 2007/0277223 A1* | 11/2007 | Datta et al. | ........................ 726/2 |
| 2014/0189326 A1* | 7/2014 | Leslie et al. | .................. 712/225 |

FOREIGN PATENT DOCUMENTS

WO   2011078855 A1   6/2011

* cited by examiner

*Primary Examiner* — Yong Choe
(74) *Attorney, Agent, or Firm* — Barnes & Thornburg LLP

(57) ABSTRACT

A system and method for adapting a secure application execution environment to support multiple configurations includes determining a maximum configuration for the secure application execution environment, determining an optimal configuration for the secure application environment, and, at load time, configuring the secure application execution environment for the optimal configuration.

25 Claims, 4 Drawing Sheets

METHOD, SYSTEM, AND DEVICE FOR MODIFYING A SECURE ENCLAVE CONFIGURATION WITHOUT CHANGING THE ENCLAVE MEASUREMENT

BACKGROUND

The term, "secure enclave," refers to a secure computing environment in which an executable software application and data can be stored and executed. A secure enclave can be implemented using a special instruction set (e.g., microcode) and an enclave page cache (EPC). The enclave page cache is secured using cryptographic techniques. A software application implemented as an enclave has a "measurement," which can be defined by a hash value that is generated based on the amount of memory (EPC pages) allocated to the application enclave and the contents, attributes, type and relative location of each page added to the enclave. The measurement can be used to verify the identity of the application and detect tampering.

Once an application enclave's measurement has been established, additional memory cannot be added to the enclave without affecting the measurement. If an application enclave's measurement changes, the identity or integrity of the application may be suspect. Therefore, application enclaves are typically created with a memory allocation that is large enough for any possible uses of the application.

BRIEF DESCRIPTION

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
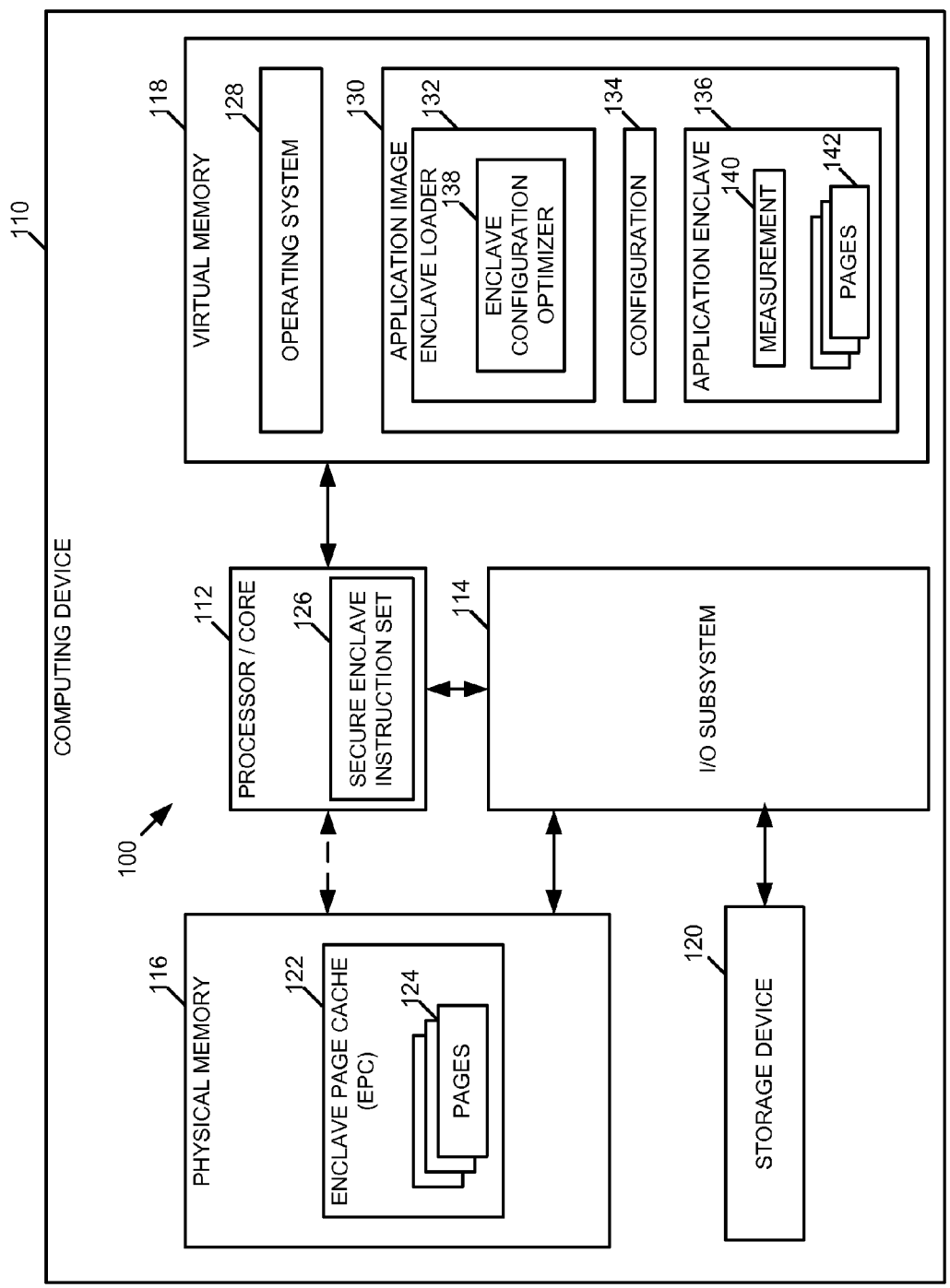
FIG. 1 is a simplified block diagram of at least one embodiment of a system for modifying the configuration of a secure application execution environment without changing its measurement.

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated by one skilled in the art, however, that embodiments of the disclosure may be practiced without such specific details. In other instances, control structures, gate level circuits and full software instruction sequences have not been shown in detail in order not to obscure the description of the of the concepts described herein. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the concepts described herein may be implemented in hardware, firmware, software, or any combination thereof. Embodiments implemented in a computer system may include one or more point-to-point or bus-based interconnects between components. Embodiments of the concepts described herein may also be implemented as instructions carried by or stored on one or more machine-readable or computer-readable storage media, which may be read and executed by one or more processors. A machine-readable or computer-readable storage medium may be embodied as any device, mechanism, or physical structure for storing or transmitting information in a form readable by a machine (e.g., a computing device). For example, a machine-readable or computer-readable storage medium may be embodied as read only memory (ROM) device(s); random access memory (RAM) device(s); magnetic disk storage media; optical storage media; flash memory devices; mini- or micro-SD cards, memory sticks, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using binary or machine-level instructions, Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

It is frequently desirable or even necessary for software applications to be capable of running in different hardware and/or software environments. For example, end users often expect their email, social networking, and digital media applications to work, whether they are using their desktop, laptop, tablet computer or mobile device, and irrespective of the device's operating system. This situation can be challenging for applications that are implemented in a secure application execution environment, such as a secure enclave, due to the security features associated with memory allocations made by the secure application execution environment. For example, a memory configuration required for a desktop implementation of a software application may be too large for a tablet computer, or the memory configuration required for the tablet implementation of the application may be too small to load on the desktop computer. As another example, an application execution environment may be implemented differently depending on the anticipated usage of the software application; for instance, whether the application may be used to process very large or very small input files.

With some secure application execution environments, such as secure enclaves, if different configurations are created for the same software application, e.g. for different hardware platforms or application uses, different measurements will result. Different measurements can be problematic for some applications. For example, if data is protected by a secure application execution environment having one type of configuration, that data may not be accessible by an application that is running in a secure application execution environment that has a different type of configuration, e.g., one that has a different measurement. In addition, maintaining multiple configurations of a secure application execution environment for a single application creates software maintenance overhead.

Referring now to FIG. 1, in one embodiment, a system 100 executable by a computing device 110 to adapt a secure application execution environment or secure application enclave 136 to a particular operating environment (e.g., a specific hardware and/or software configuration of the computing device 110), without affecting the measurement associated with the secure application execution environment, is shown. The illustrative embodiments of the system 100 are shown in the context of one exemplary type of secure application execution environment known as a "secure enclave." Some examples of secure enclaves are described in Patent Cooperation Treaty Application No. PCT/US2009/069212, published as WO 2011/078855 ("Method and Apparatus to Provide Secure Application Execution"). It should be appreciated by those skilled in the art, however, that although the terms "secure enclave," "application enclave," and/or "enclave" may be used herein for ease of discussion, aspects of this disclosure are applicable to various types of secure enclaves and other types of secure application execution environments.

FIG. 1 shows a state of the system 100 at load time; that is, at the time when a secure application enclave 136 having a configuration 134 and a measurement 140 is created and initialized for use by an executable software application 130. The system 100 includes an enclave loader 132, which creates and initializes the secure application enclave 136. In some embodiments, the enclave loader 132 may be implemented as a dynamic library that is loaded or mapped into the virtual address space of the application 130 at load time. The enclave loader 132 includes an enclave configuration optimizer 138, which can selectively adjust the number of pages 142 of virtual memory in the secure application enclave 136 without affecting the enclave's measurement 140. In this way, executable applications implemented using a secure enclave (or other secure application execution environment) can be adapted to different hardware and/or software operating environments, dynamically at load time and without introducing the limitations mentioned above.

The computing device 110 may be embodied in or as any suitable type of computing device capable of performing the functions and features described herein as being performable by the enclave loader 132, the enclave configuration optimizer 138, and/or any components thereof. For example, the computing device 110 may be embodied as a computer, a personal computer (PC), a desktop computer, a laptop computer, a notebook computer, a tablet computer, a handheld computer, a mobile electronic device, a smartphone, a server, a server array or server farm, a web server, a network server, an enterprise server, an Internet server, a work station, a mini-computer, a main frame computer, a supercomputer, a network appliance, a web appliance, a distributed computing system, multiprocessor systems, processor-based systems, or combination of any of the foregoing.

The illustrative processor or processor core 112 may include one or multiple processor cores or logical sections of a single processor core (e.g., microprocessor). Each processor or core 112 may be configured with a secure enclave instruction set 126. The illustrative secure enclave instruction set 126 includes a number of hardware instructions (e.g., microcode and/or extended microcode) that can be used by an operating system 128 of the computing device 110 to implement a secure enclave for an executable application. Some examples of hardware instructions that may be included in the secure enclave instruction set 126 are described in the above-referenced PCT patent application, WO 2011/078855, and some of these exemplary instructions may be mentioned below in the description of the illustrative embodiments.

The illustrative processor/core 112 includes or is communicatively coupled to one or more physical memory 116. The illustrative memory 116 is embodied as cache memory, which may be utilized to temporarily store data and/or instructions during operation of the enclave loader 132, the enclave configuration optimizer 138 and/or other components of the computing device 110.

In addition to the cache memory, portions of the memory 116 may be embodied as any type of main memory, e.g., a suitable memory device, such as a dynamic random access memory device (DRAM), synchronous dynamic random access memory device (SDRAM), double-data rate dynamic random access memory device (DDR SDRAM) and/or other volatile memory devices. A secure memory structure, which may be known as an enclave page cache (EPC) 122, is located within the physical memory 116 and can be accessed using instructions from the secure enclave instruction set 126. The illustrative EPC 122 includes a number of memory pages 124. The EPC 122 provides one or more access control mechanisms configured to protect the integrity and confidentiality of the pages 124 therein. For example, in some embodiments, the EPC 122 maintains a coherency protocol similar to that used for coherent physical memory of the computing device 110. The EPC 122 may be embodied as dedicated SRAM on the processor/core 112 in some embodiments. In some embodiments, a Crypto Memory Aperture mechanism may be used to implement the EPC 122.

At load time, all or portions of the operating system 128 and the executable application 130 are loaded into virtual memory 118. As described in greater detail below, the illustrative application 130 has associated therewith a configuration 134, which is used by the enclave loader 132 and the enclave configuration optimizer 138 to create the application enclave 136. Based on the configuration 134, the enclave loader 132 adds pages of virtual memory 142 to the application enclave 136. The pages 142 are backed physically by the pages 124 of the EPC 122. The application enclave 136 also has associated therewith a measurement 140, which is related to the configuration 134 as described below.

The illustrative processor/core 112 is also communicatively coupled to an I/O subsystem 114. Although not specifically shown, the I/O subsystem 114 typically includes a memory controller subsystem or northbridge, an input/output controller subsystem or southbridge, and a firmware device. Of course, in other embodiments, I/O subsystems having other configurations may be used. For example, in some embodiments, the I/O subsystem 114 may form a portion of a system-on-a-chip (SoC) and be incorporated, along with the processor/core 112 and other components of the computing device 110, on a single integrated circuit chip. As such, it will be appreciated that each component of the I/O subsystem 114 may be located on a common integrated circuit chip in some embodiments.

The illustrative I/O subsystem 114 is communicatively coupled to one or more storage devices 120. All or portions of the illustrative storage device 120 may be embodied as any suitable device for storing data and/or instructions, such as disk storage (e.g. hard disks), memory cards, memory sticks, and/or others. In some embodiments, portions of the operating system 128, the application 130, the enclave loader 132, and/or the enclave configuration optimizer 138 may be embodied in the storage device 120 at different times. As shown in FIG. 1, during loading and execution, portions of the operating system 128, the application 130, the enclave loader 132, and/or the enclave configuration optimizer 138 may be assigned to the virtual memory 118, for faster processing or other reasons.

The I/O subsystem 114 may be communicatively coupled to one or more peripheral devices (not shown), which may include one or more network interfaces, graphics and/or video adaptors, keyboard, touchscreens, displays, printers, data storage devices, and/or other peripheral devices, depending upon, for example, the intended use of the computing device 110. Further, it should be appreciated that the computing device 110 may include other components, sub-components, and devices not illustrated in FIG. 1 for clarity of the description.

In general, the components of the computing device 110 are communicatively coupled as shown in FIG. 1, by one or more signal paths, which are represented schematically as double-headed arrows. Such signal paths may be embodied as any type of wired or wireless signal paths capable of facilitating communication between the respective devices. For example, the signal paths may be embodied as any number of wires, printed circuit board traces, via, bus, point-to-point interconnects, intervening devices, and/or the like.

Figure 2:
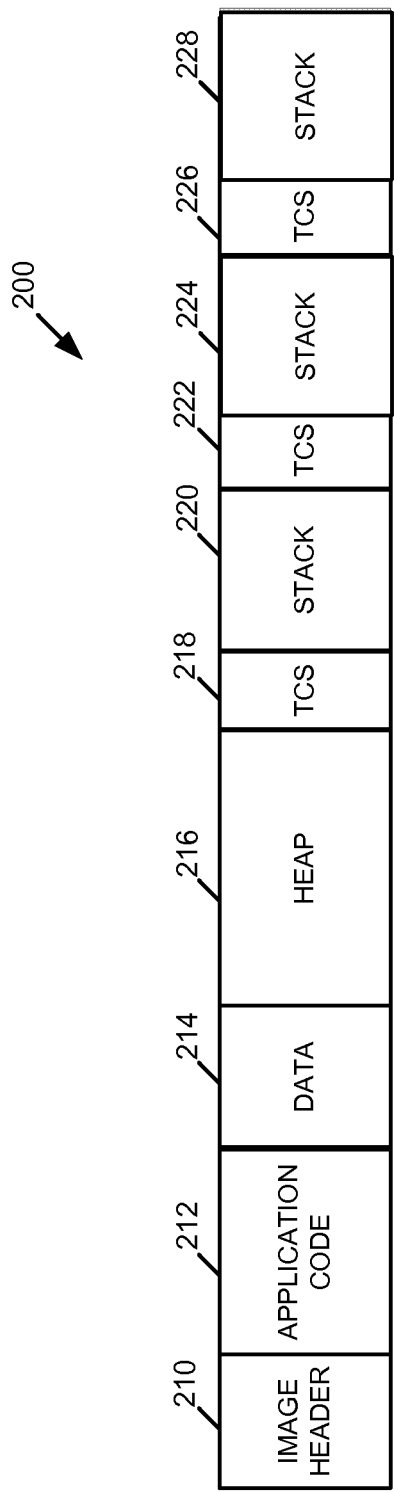
FIG. 2 is a simplified schematic representation of at least one embodiment of a memory layout for a secure application execution environment in a "maximum" configuration.

Referring now to FIG. 2, when an executable version of a software application is created (e.g., built and marked for execution), a memory layout for the executable application; that is, the memory structures that the application will need in order to run in a particular operating environment (e.g., hardware and/or software configuration), and the order in which the memory structures will be needed, are determined. In the illustrative examples, this memory layout refers to static memory; that is, a static set of pages that are generated (e.g., by a linker), and does not include dynamically allocated memory. The memory layout is typically determined by the application developer; however, it may be determined in an automated fashion, e.g., by the enclave loader 132 or the application 130, in some embodiments. FIG. 2 is a simplified illustration of a memory layout 200 for an application enclave 136. The memory layout 200 corresponds to a configuration 134. The illustrative configuration 134 specifies the total amount of (static) memory required for execution of the application 130 in a given operating environment. In the illustrative embodiments, the configuration 134 corresponds to a "maximum configuration," that is, a memory allocation (e.g., a number of pages, for each type of required memory structure) that will be large enough for any possible uses of the application 130 (e.g., in any hardware and/or software operating environment). The "maximum" configuration therefore specifies, for example, the maximum number of threads supported by the application 130 (and thus, the maximum number of thread control structures), as well as the maximum or upper bound of heap and/or stack sizes required by the application 130 under any circumstances. The maximum configuration is typically determined by the application developer; however, it may be determined in an automated fashion, e.g., by a program compiler or linker, in some embodiments.

In the illustrative example of FIG. 2, the memory layout 200 includes a maximum arrangement of virtual memory space that may be required for the application image header 210, the application code 212, data 214, heap 216, thread control structures (or "per-thread structures") 218, 222, 226 (it having been pre-determined, in this example, that the application 130 may run using three concurrent threads on hardware configurations that can support the same), and stacks 220, 224, 228 (e.g., one stack for each thread). The memory layout 200 for the maximum configuration is used to determine the measurement 140 for the application enclave 136. In the illustrative embodiments, the measurement 140 is a hash value of the pages in the application enclave 136 as defined by the memory layout 200 for the maximum configuration (e.g., the arrangement or ordering of the various memory structures that may be required for the maximum configuration). For example, in some embodiments, the memory pages (or a digital representation thereof) in the application enclave 136 are input to a secure hash function, and the output of the secure hash function is included in the measurement 140 (e.g. as a digital signature). In other embodiments, other techniques (now known or later developed) for creating a secure digital signature and associating it with the application enclave 136, or otherwise cryptographically securing the enclave 136, may be used.

Figure 3:
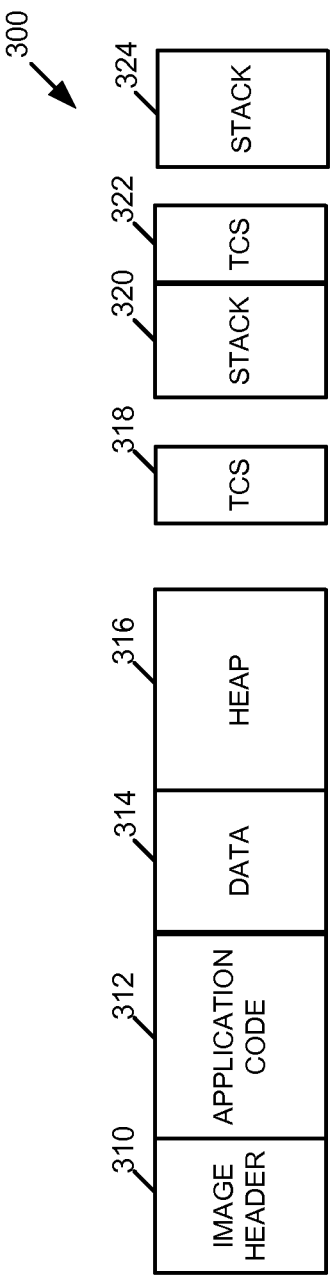
FIG. 3 is a simplified schematic representation of at least one embodiment of a memory layout for the secure application execution environment of FIG. 2 in an "optimal" configuration.

Referring now to FIG. 3, a modified or "optimized" memory layout 300 is shown. The memory layout 300 illustrates an "optimal" memory configuration for the application enclave 136, as determined by the enclave loader 132 or more specifically, the enclave configuration optimizer 138, at load time. The memory structures illustrated in FIG. 3 as elements 310, 312, 314, 316, 318, 320, 322, 324 are the same memory structures as those illustrated in FIG. 2 as the corresponding elements 210, 212, 214, 216, 218, 220, 222, 224, 226, 228, except that in FIG. 3, some of the pages of virtual memory have been removed from some of the memory structures. Also in FIG. 3, pages allocated for memory structures that are included in the maximum configuration but which are not needed by the optimal configuration have been removed. More specifically, in the illustrative memory layout 300, the number of pages allocated for the image header 310, the application code 312, the data 314 and the thread control structures 318, 322, is the same as that allocated for the corresponding elements 210, 212, 214, 218, and 222 of FIG. 2. However, in the case of the heap 316, the stack 320, and the stack 324, some pages have been determined to be unneeded by the optimal configuration, and have therefore been removed from the application enclave 136 by the enclave configuration optimizer 138. Additionally, in the illustrative example, the enclave configuration optimizer 138 has also determined that the application 130 only needs two threads in the optimal configuration; therefore, memory pages associated with the thread control structure 226 and the stack 228 have been removed from the application enclave 136, and these memory structures are, effectively, not part of the optimal configuration. Notwithstanding the removal of pages in the optimal configuration, the arrangement (e.g., sequential ordering: code follows header, data follows code, heap follows data, etc.) of the memory structures in the memory layout 300 is the same as that of the memory layout 200. As a result, the measurement 140 (a/k/a digital signature) for the application enclave 136 is not affected by the removal of pages.

In one illustrative example, the application 130 may be a media codec, which may be implemented with a secure application enclave 136 in order to protect premium or confidential media inputs, or for other reasons. The codec application code may be able to run on a powerful desktop computer platform to decode large high-definition (HD) video files, but may also run on a handheld tablet computer to render the same video on a much smaller display screen. In the former case, high-definition rendering requires more memory and computing power, which could be accomplished by using a larger heap and more concurrent threads. However, in the latter case, the tablet computer, having less memory and computing power than the desktop, may require the codec to run with a smaller memory footprint and in fewer threads (which may result in lower-definition output). In order to keep the measurement 140 the same in both cases, the larger configuration (i.e., the desktop configuration of a large heap and many concurrent threads) could be loaded on both devices. Notwithstanding the inefficiencies of loading unneeded memory in the tablet computer configuration, the memory resources on the tablet may be insufficient to load the desktop version of the codec in the first place (even if the inefficiency would be acceptable). As a result, the tablet implementation of the codec enclave may require a different memory configuration than the desktop version. However, in the illustrative embodiments, different configurations result in different measurements 140. As noted above, application enclaves having different measurements for different implementations can be problematic in at least some instances.

According to this disclosure, the enclave configuration optimizer 138 can, when the secure application enclave 136 is created for the codec, determine a maximum memory configuration and an optimal memory configuration for the codec enclave. For example, based on the actual usage of the codec (e.g., the anticipated type/resolution of the input video files) and/or the hardware capabilities of the computing device on which it is desired to run the codec, the enclave memory configuration for the codec can be adjusted at load time. In the illustrative embodiment, a maximum memory configuration is first determined as described above. In the codec example, the maximum configuration may be determined based on the desktop computer environment and/or on an assumption that video inputs may have a definition of 1600×900. If the codec is ported to a smaller device (such as the tablet computer), the host device (e.g. the tablet) can determine memory requirements that are smaller than those required by the maximum configuration. For instance, if the tablet has fewer processors available than would be required by the number of threads specified in the maximum configuration, or if the tablet implementation of the codec is configured to decode only 800×450 definition video inputs, then a more optimal memory configuration can be determined for the tablet, based on characteristics of the input media, the computing capacity provided by the tablet computer, and/or other factors, and implemented by the enclave configuration optimizer 138 as described herein.

Figure 4:
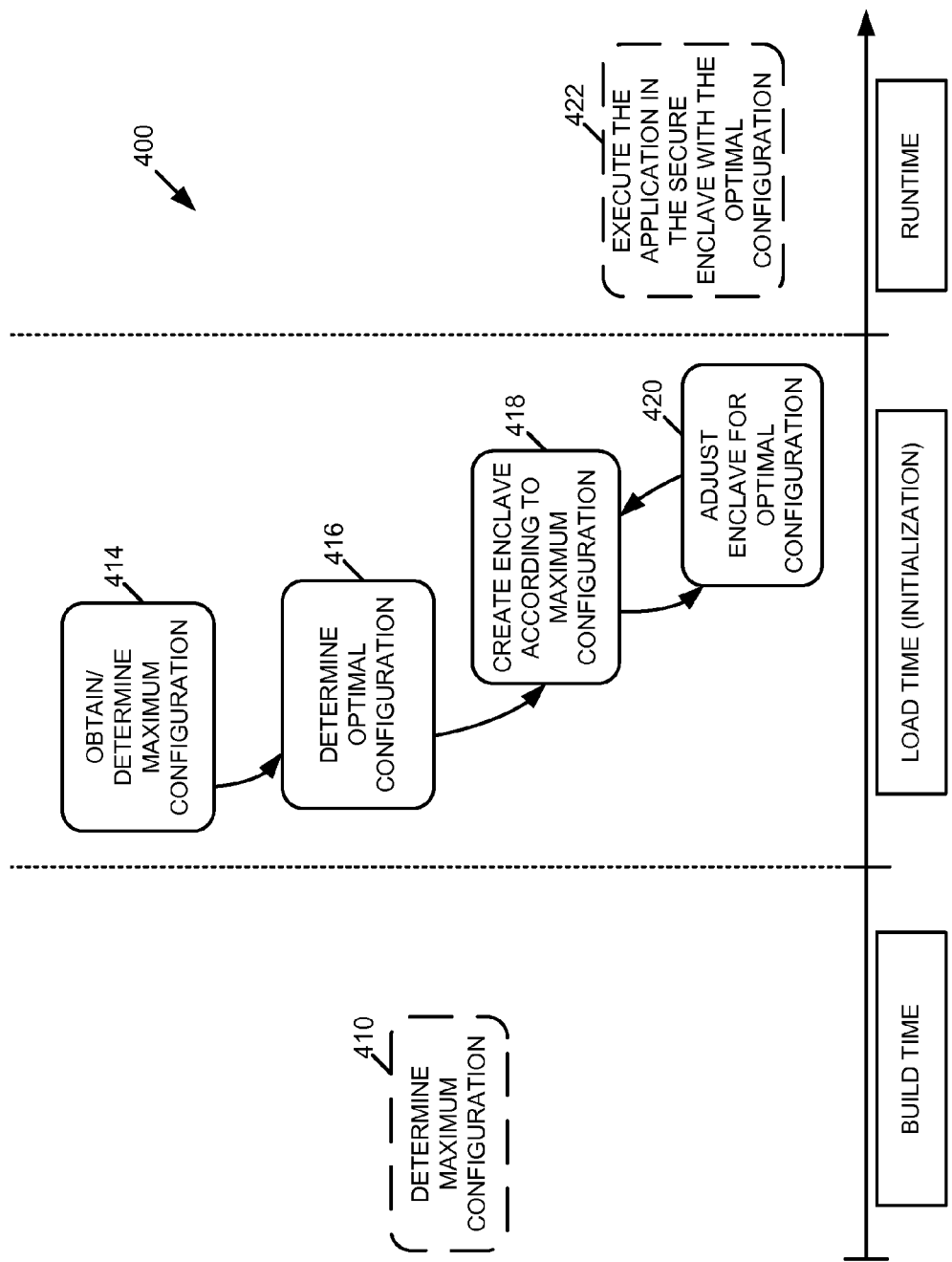
FIG. 4 is a simplified module diagram of at least one embodiment of executable modules of the system of FIG. 1.

Referring now to FIG. 4, in an embodiment 400 of the system 100, the illustrative enclave loader 132, including the enclave configuration optimizer 138, is embodied as one or more computerized logic units, routines, and/or modules (e.g., hardware instructions, microcode, software and/or firmware). In FIG. 4, illustrative logic units of the enclave configuration optimizer 138 are shown in the context of an application lifecycle that includes a build time (in which an executable version of a software application is created), a load time (in which the executable application is implemented with a secure application enclave, and a runtime (in which the executable application runs on a computing device). During build time, the maximum configuration is determined (e.g., by the application developer) and attached or appended to the application image file by a logic unit 410. The logic unit 410 is shown in dashed lines to illustrate that it need not be part of the enclave configuration optimizer 138.

At load time, a logic unit 414 obtains or otherwise determines the maximum configuration for the application enclave 136 (e.g., by extracting the configuration information from the application image file). The logic unit 416 determines an optimal configuration based on application- and/or device-specific parameters as described above. In some embodiments, the optimal configuration may be pre-specified (e.g. hard-coded) and simply passed to the logic unit 416 as needed. In the illustrative embodiments, the optimal memory configuration is always smaller than the maximum configuration; that is, the optimal configuration has fewer pages of virtual memory than does the maximum configuration.

The logic unit 418 creates and initializes the secure application enclave 136 according to the maximum configuration. That is, the memory requirements specified by the maximum configuration are used to create and initialize the secure application enclave 136, and thus, are the basis for the measurement 140. During initialization of the secure application enclave 136, the logic unit 420 selectively removes pages of virtual memory from the secure application enclave 136 that are specified by the maximum configuration but which are not required by the optimal configuration. In the illustrative embodiments and as described further below, the adding and selective removing of pages is an iterative process. At runtime, an operating system process 422 executes the application 130 as implemented with the secure application enclave 136 according to the optimal memory configuration and having the same measurement 140 as the maximum configuration.

Figure 5:
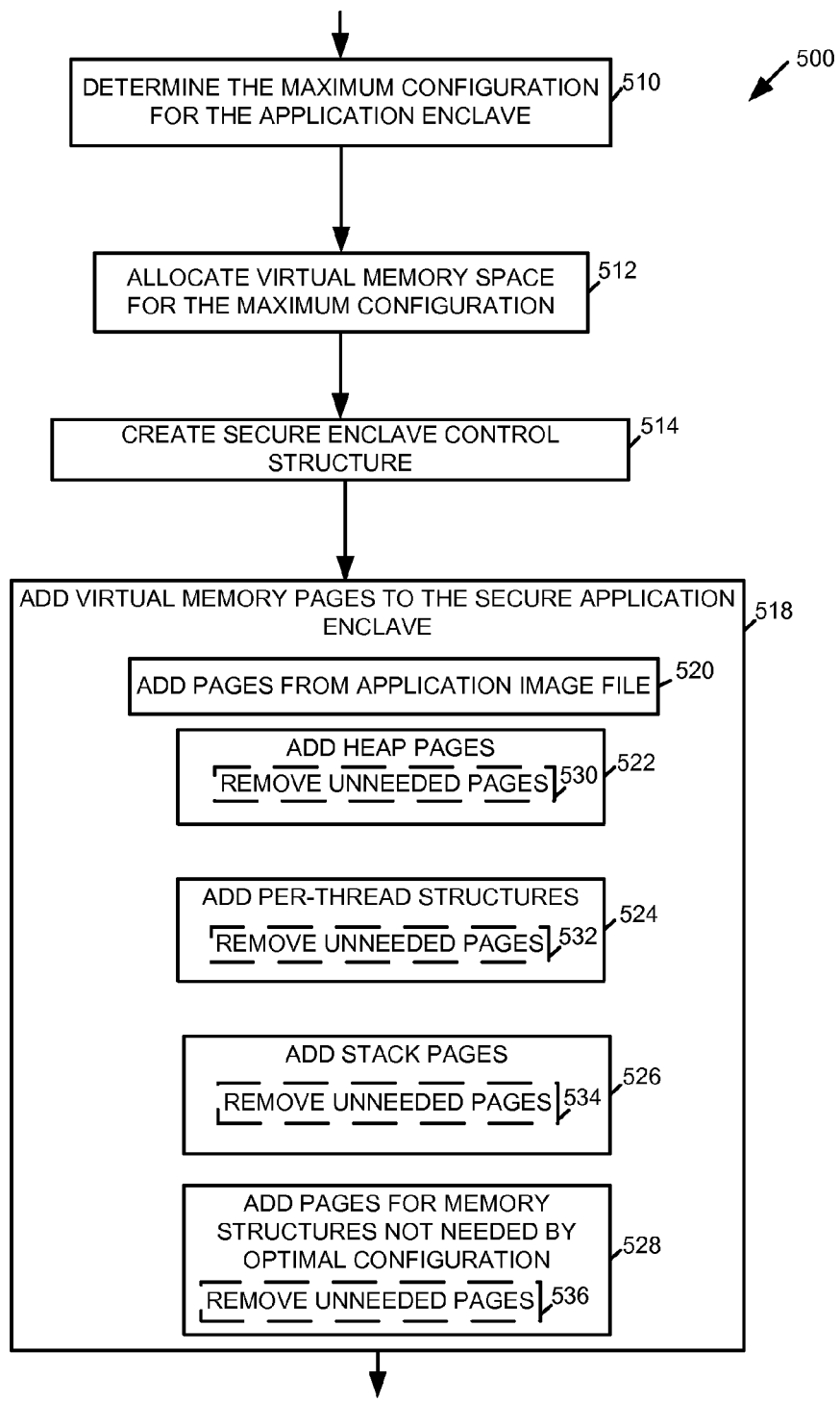
FIG. 5 is a simplified flow diagram of at least one embodiment of a method for modifying the configuration of a secure application execution environment, which may be executed by one or more modules of the system of FIG. 1.

Referring now to FIG. 5, an illustrative method 500 executable as computerized logic and/or instructions (e.g. hardware instructions or microcode) by the enclave configuration optimizer 138, to adapt a secure application enclave 136 to different operating environments, is shown. At block 510, the method 500 determines the maximum memory configuration for the secure application enclave 136. As mentioned above, this may be a matter of simply reading the pre-specified (e.g., hard-coded) maximum configuration information (e.g., the maximum virtual memory allocation that may be required by the application 130 for any uses) from the application image file 130.

At block 512, the method 500 allocates the virtual memory space for the maximum configuration to the secure application enclave 136. This involves calculating the amount of virtual memory needed for the maximum configuration of the secure application enclave 136 (e.g., by adding together the size of the application image 130, the heap size and the size of per-thread structures, then rounding the sum by some constant (e.g., the next perfect power of 2) as may be stipulated by the secure enclave instruction set 126. A virtual memory allocation instruction of the secure enclave instruction set 126 (e.g., "VirtualAlloc") may be used to reserve the virtual memory space for the secure application enclave 136 according to the calculated requirements.

At block 514, the method 500 creates a secure enclave control structure in the enclave page cache 122. Generally speaking the secure enclave control structure serves to conform the secure application enclave 136 to the architecture specified by the secure enclave instruction set 126. At block 518, the method 500 adds the virtual memory pages needed for each of the memory structures specified in the maximum configuration to the secure application enclave 136 and removes those pages that are not needed by the optimal configuration. In the illustrative embodiments, an instruction (e.g., "EAddPage") specified by the secure enclave instruction set 126 is used to add the pages needed by the memory structures specified by the maximum configuration to the secure application enclave 136. As shown by blocks 520, 522, 524 and 528, the pages needed by the various memory structures illustrated in FIG. 2 are added by separate routines in the illustrative embodiments. This is because at each of blocks 522, 524, and 528, the enclave configuration optimizer 138 determines whether any of the pages added for the maximum configuration are not needed by the optimal configuration, and immediately removes the unneeded pages, if any, from the appropriate locations in the layout, at blocks 530, 532, and 536.

At block 520, the pages from the application image file 130 are added to the secure application enclave 136 at the proper location as indicated by an "offset" value. In the illustrative embodiment, the offset is determined by initializing a source page (e.g., a page with the contents being 0's, or a "zero page") and then returning the location of the next available page. At block 522, the method 500 adds the amount of heap pages specified by the maximum configuration to the secure application enclave 136, up to the number of heap pages specified by the optimal configuration. In the illustrative embodiment, a counter is used to keep track of the number of heap pages added, and the counter is checked against the optimal configuration until the optimal configuration is reached. Once the optimal configuration is reached, the method 500 continues adding heap pages up to the amount specified by the maximum configuration, but invokes the enclave configuration optimizer 138 at block 530 to immediately remove those pages that are not required by the optimal configuration (as may be determined by comparing the counter value to the optimal configuration). In the illustrative embodiments, an instruction (e.g., "ERemovePage") specified by the secure enclave instruction set 126 is used to remove the unneeded pages from the secure application enclave 136 from the proper location (which may be determined by subtracting the page size of one page from the offset), without affecting the measurement 140. Immediately removing the unneeded pages after they have been added results in, effectively, the unneeded pages never being actually added to the secure application enclave 136. However, the measurement 140 remains unaffected as a result of the initial adding of the pages to the secure application enclave 136. A similar process of adding pages and then immediately removing unneeded pages is performed for per-thread structures, which include stack pages, Thread Control Structures (TCS), State Save Area (SSA), Thread Local Storage (TLS) (blocks 524, 532), as well as unneeded threads (which may include any or all of the foregoing per-thread structures (blocks 528, 536). Blocks 530, 532, 534, and 536 are shown in dashed lines to illustrate that in some embodiments, there may be no need to remove pages allocated for certain types of memory structures (that is, if the optimal configuration is the same as the maximum configuration for those memory structures).

EXAMPLES

Illustrative examples of the devices, systems, and methods disclosed herein are provided below. An embodiment of the devices, systems, and methods may include any one or more, and any combination of, the examples described below.

In one example, a computing device to provide a secure environment for execution of an executable application includes at least one memory device comprising a page cache to supply pages of virtual memory for the secure execution environment; at least one processor comprising an instruction set to enable creation and management of the secure execution environment; a loader to, at load time, create the secure execution environment for the executable application, the secure execution environment being configured for a first hardware configuration and having a measurement, the measurement usable to protect the security of the secure execution environment; and an optimizer to, at load time, configure the secure execution environment for a second hardware configuration different than the first hardware configuration without changing the measurement.

In an example, the loader may be embodied as a dynamic library loadable into virtual memory associated with the executable application. In an example, the optimizer may be embodied as at least one sub-module of the loader. In an example, the optimizer may be configured to remove virtual memory pages from the secure execution environment without affecting the measurement. In an example, the optimizer may be configured to determine a maximum memory configuration for the secure execution environment, determine an optimal memory configuration for the secure execution environment, determine a difference between the maximum memory configuration and the optimal memory configuration, and remove a number of virtual memory pages corresponding to the difference between the maximum memory configuration and the optimal memory configuration from the secure execution environment without affecting the measurement.

In an example, the optimizer may be configured to determine a maximum memory configuration for the secure execution environment comprising a first number of virtual memory structures for any possible usage of the executable application, determine an optimal memory configuration for the secure execution environment comprising a second number of virtual memory structures for a particular use of the executable application, and compare the first number of virtual memory structures to the second number of virtual memory structures. In an example, the optimizer may be configured to remove a number of virtual memory pages from the secure execution environment in response to the compare of the first number to the second number. In an example, the virtual memory structures may include a heap and at least one per-thread structure, and the optimizer may be configured to remove a number of virtual memory pages from the secure execution environment for each of the heap and the at least one per-thread structure. In an example, the optimizer may be configured to determine the order in which the virtual memory structures are arranged in the maximum memory configuration and maintain the order in the configured secure execution environment.

In another example, a loader embodied in at least one machine readable storage media of a computing device to provide a secure environment for execution of an executable application on the computing device, is configured to, at load time, determine a maximum configuration for the secure environment; determine an optimal configuration for the secure environment based on at least one requirement of the executable application and/or at least one hardware capability of the computing device; create the secure environment with a memory layout corresponding to the maximum configuration; and modify the memory layout to correspond to the optimal configuration.

In an example, the loader may be embodied as a dynamic library loadable into virtual memory associated with the executable application on the computing device. In an example, the loader may be configured to determine an amount of virtual memory required by the maximum configuration, allocate virtual address space for the determined amount of virtual memory, add pages of virtual memory to the virtual address space according to the determined amount of virtual memory associated with the maximum configuration, determine an amount of virtual memory required by the optimal configuration, and remove pages from the virtual address space that are not required by the optimal configuration. In an example, the loader may be configured to determine a number of heap pages required by the maximum configuration, determine a number of heap pages required by the optimal configuration, add pages of virtual memory to the virtual address space for the determined number of heap pages required by the maximum configuration, and remove heap pages from the virtual address space that are not required by the optimal configuration. In an example, the loader may be configured to determine a number of pages for thread control structures required by the maximum configuration, determine a number of pages for thread control structures required by the optimal configuration, add pages of virtual memory to the virtual address space for the determined number of pages for thread control structures required by the maximum configuration, and remove pages for thread control structures from the virtual address space that are not required by the optimal configuration. In an example, the loader may be configured to determine a number of stack pages required by the maximum configuration, determine a number of stack pages required by the optimal configuration, add pages of virtual memory to the virtual address space for the determined number of stack pages required by the maximum configuration, and remove stack pages from the virtual address space that are not required by the optimal configuration. In an example, the loader may be configured to determine a number of threads required by the maximum configuration, determine a number of threads required by the optimal configuration, add pages of virtual memory to the virtual address space for the determined number of threads required by the maximum configuration, and remove pages of virtual memory from the virtual address space for threads that are not required by the optimal configuration.

In a further example, a method for creating a secure application execution environment to be usable in multiple different hardware environments, the secure application execution environment having a maximum memory configuration and a measurement associated therewith, the measurement usable to protect the security of the secure application execution environment, includes determining an optimal memory configuration for the secure application execution environment, the optimal memory configuration comprising fewer pages of memory than the maximum memory configuration; determining a number of memory pages in the maximum memory configuration that are not needed by the optimal memory configuration; and in response to memory pages being added to the secure application execution environment, removing the memory pages not needed by the optimal memory configuration without affecting the measurement of the secure application execution environment.

In an example, the method may include determining a memory layout for the secure application execution environment, the memory layout comprising a specified order of memory structures, and removing the memory pages according to the specified order. In an example, the method may include determining a number of heap pages needed by the optimal configuration, determining a number of heap pages in the maximum memory configuration that are not needed by the optimal configuration, and, for each heap page in the maximum memory configuration that is not needed by the optimal configuration, adding the heap page to the secure application execution environment and then immediately removing the heap page from the secure application execution environment. In an example, the method may include determining a number of stack pages needed by the optimal configuration, determining a number of stack pages in the maximum memory configuration that are not needed by the optimal configuration, and, for each stack page in the maximum memory configuration that is not needed by the optimal configuration, adding the stack page to the secure application execution environment and then immediately removing the stack page from the secure application execution environment. In an example, the method may include determining a number of pages for thread control structures needed by the optimal configuration, determining a number of pages for thread control structures in the maximum memory configuration that are not needed by the optimal configuration, and, for each page for thread control structures in the maximum memory configuration that is not needed by the optimal configuration, adding the page for thread control structures to the secure application execution environment and then immediately removing the page for thread control structures from the secure application execution environment. In an example, the method may include determining a number of threads needed by the optimal configuration, determining a number of threads in the maximum memory configuration that are not needed by the optimal configuration, and, for each thread in the maximum memory configuration that is not needed by the optimal configuration, adding the pages for the thread to the secure application execution environment and then immediately removing the pages for the thread from the secure application execution environment.

In another example, a computing device includes a processor; and a memory having stored therein a plurality of instructions that when executed by the processor cause the mobile digital information display device to perform the foregoing method.

In another example, one or more machine readable storage media including a plurality of instructions stored therein that in response to being executed result in a computing device determining an optimal configuration for a secure application execution environment based on at least one requirement of at least one of an executable application and a hardware capability of the computing device, the secure application execution environment having a memory configuration and a measurement associated therewith, the measurement usable to protect the security of the secure application execution environment; and modifying the memory configuration to correspond to the optimal configuration without affecting the measurement.

In an example, the one or more machine readable storage media may be configured to modify the memory configuration during initialization of the secure application execution environment. In an example, the one or more machine readable storage media may be configured to determine an optimal configuration during initialization of the secure application execution environment. In an example, the one or more machine readable storage media may be configured to determine the at least one requirement during initialization of the secure application execution environment.

While the concepts of the present disclosure have been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

The invention claimed is:

1. A computing device to provide a secure environment for execution of an executable application, the computing device comprising:
at least one memory device comprising a page cache to supply pages of virtual memory for the secure execution environment;
at least one processor comprising an instruction set to enable creation and management of the secure execution environment;
a loader to, at load time, create the secure execution environment for the executable application, the secure execution environment being configured for a first hardware configuration and having a measurement, the measurement usable to protect the security of the secure execution environment; and
an optimizer to, at load time, configure the secure execution environment for a second hardware configuration different than the first hardware configuration without changing the measurement.

2. The computing device of claim 1, wherein the optimizer is embodied as at least one sub-module of the loader.

3. The computing device of claim 1, wherein the optimizer is configured to remove virtual memory pages from the secure execution environment without affecting the measurement.

4. The computing device of claim 1, wherein the optimizer is configured to determine a maximum memory configuration for the secure execution environment, determine an optimal memory configuration for the secure execution environment, determine a difference between the maximum memory configuration and the optimal memory configuration, and remove a number of virtual memory pages corresponding to the difference between the maximum memory configuration and the optimal memory configuration from the secure execution environment without affecting the measurement.

5. The computing device of claim 1, wherein the optimizer is configured to determine a maximum memory configuration for the secure execution environment comprising a first number of virtual memory structures for any possible usage of the executable application, determine an optimal memory configuration for the secure execution environment comprising a second number of virtual memory structures for a particular use of the executable application, and compare the first number of virtual memory structures to the second number of virtual memory structures.

6. The computing device of claim 5, wherein the optimizer is configured to remove a number of virtual memory pages from the secure execution environment in response to the compare of the first number to the second number.

7. The computing device of claim 6, wherein the at least one memory device is configured to provide virtual memory structures including a heap and at least one per-thread structure, and the optimizer is configured to remove a number of virtual memory pages from the secure execution environment for each of the heap and the at least one per-thread structure.

8. The computing device of claim 7, wherein the optimizer is configured to determine the order in which the virtual memory structures are arranged in the maximum memory configuration and maintain the order in the configured secure execution environment.

9. A loader embodied in at least one machine readable storage media of a computing device to provide a secure environment for execution of an executable application on the computing device, the loader configured to, at load time:
determine a maximum configuration for the secure environment;
determine an optimal configuration for the secure environment based on at least one requirement of the executable application and/or at least one hardware capability of the computing device;
create the secure environment with a memory layout corresponding to the maximum configuration; and
modify the memory layout to correspond to the optimal configuration.

10. The loader of claim 9, wherein the loader is embodied as a dynamic library loadable into virtual memory associated with the executable application on the computing device.

11. The loader of claim 9, wherein the loader is configured to determine an amount of virtual memory required by the maximum configuration, allocate virtual address space for the determined amount of virtual memory, add pages of virtual memory to the virtual address space according to the determined amount of virtual memory associated with the maximum configuration, determine an amount of virtual memory required by the optimal configuration, and remove pages from the virtual address space that are not required by the optimal configuration.

12. The loader of claim 9, wherein the loader is configured to determine a number of heap pages required by the maximum configuration, determine a number of heap pages required by the optimal configuration, add pages of virtual memory to the virtual address space for the determined number of heap pages required by the maximum configuration, and remove heap pages from the virtual address space that are not required by the optimal configuration.

13. The loader of claim 9, wherein the loader is configured to determine a number of pages for thread control structures required by the maximum configuration, determine a number of pages for thread control structures required by the optimal configuration, add pages of virtual memory to the virtual address space for the determined number of pages for thread control structures required by the maximum configuration, and remove pages for thread control structures from the virtual address space that are not required by the optimal configuration.

14. The loader of claim 9, wherein the loader is configured to determine a number of stack pages required by the maximum configuration, determine a number of stack pages required by the optimal configuration, add pages of virtual memory to the virtual address space for the determined number of stack pages required by the maximum configuration, and remove stack pages from the virtual address space that are not required by the optimal configuration.

15. The loader of claim 9, wherein the loader is configured to determine a number of threads required by the maximum configuration, determine a number of threads required by the optimal configuration, add pages of virtual memory to the virtual address space for the determined number of threads required by the maximum configuration, and remove pages of virtual memory from the virtual address space for threads that are not required by the optimal configuration.

16. A method for creating a secure application execution environment to be usable in multiple different hardware environments, the secure application execution environment having a maximum memory configuration and a measurement associated therewith, the measurement usable to protect the security of the secure application execution environment, the method comprising:
    determining an optimal memory configuration for the secure application execution environment, the optimal memory configuration comprising fewer pages of memory than the maximum memory configuration;
    determining a number of memory pages in the maximum memory configuration that are not needed by the optimal memory configuration; and
    in response to memory pages being added to the secure application execution environment, removing the memory pages not needed by the optimal memory configuration without affecting the measurement of the secure application execution environment.

17. The method of claim 16, comprising determining a memory layout for the secure application execution environment, the memory layout comprising a specified order of memory structures, and removing the memory pages according to the specified order.

18. The method of claim 16, comprising determining a number of heap pages needed by the optimal configuration, determining a number of heap pages in the maximum memory configuration that are not needed by the optimal configuration, and, for each heap page in the maximum memory configuration that is not needed by the optimal configuration, adding the heap page to the secure application execution environment and then immediately removing the heap page from the secure application execution environment.

19. The method of claim 16, comprising determining a number of stack pages needed by the optimal configuration, determining a number of stack pages in the maximum memory configuration that are not needed by the optimal configuration, and, for each stack page in the maximum memory configuration that is not needed by the optimal configuration, adding the stack page to the secure application execution environment and then immediately removing the stack page from the secure application execution environment.

20. The method of claim 16, comprising determining a number of pages for thread control structures needed by the optimal configuration, determining a number of pages for thread control structures in the maximum memory configuration that are not needed by the optimal configuration, and, for each page for thread control structures in the maximum memory configuration that is not needed by the optimal configuration, adding the page for thread control structures to the secure application execution environment and then immediately removing the page for thread control structures from the secure application execution environment.

21. The method of claim 16, comprising determining a number of threads needed by the optimal configuration, determining a number of threads in the maximum memory configuration that are not needed by the optimal configuration, and, for each thread in the maximum memory configuration that is not needed by the optimal configuration, adding the pages for the thread to the secure application execution environment and then immediately removing the pages for the thread from the secure application execution environment.

22. One or more non-transitory machine readable storage media comprising a plurality of instructions stored therein that in response to being executed result in a computing device:
    determining an optimal configuration for a secure application execution environment based on at least one requirement of at least one of an executable application and a hardware capability of the computing device, the secure application execution environment having a memory configuration and a measurement associated therewith, the measurement usable to protect the security of the secure application execution environment; and
    modifying the memory configuration of the secure application execution environment to correspond to the optimal configuration without affecting the measurement.

23. The one or more non-transitory machine readable storage media of claim 22, comprising modifying the memory configuration during initialization of the secure application execution environment.

24. The one or more non-transitory machine readable storage media of claim 22, comprising determining an optimal configuration during initialization of the secure application execution environment.

25. The one or more non-transitory machine readable storage media of claim 22, comprising determining the at least one requirement during initialization of the secure application execution environment.

* * * * *